(12) United States Patent
Kanno et al.

(10) Patent No.: US 9,248,830 B2
(45) Date of Patent: Feb. 2, 2016

(54) CONTROL APPARATUS OF HYBRID VEHICLE

(71) Applicant: Toyota Jidosha Kabushiki Kaisha, Toyota-shi Aichi-ken (JP)

(72) Inventors: Yoshihito Kanno, Numazu (JP); Gohki Kinoshita, Susono (JP); Hiroki Morita, Hiratsuka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/432,409

(22) PCT Filed: Dec. 5, 2012

(86) PCT No.: PCT/JP2012/081518
§ 371 (c)(1),
(2) Date: Mar. 30, 2015

(87) PCT Pub. No.: WO2014/087501
PCT Pub. Date: Jun. 12, 2014

(65) Prior Publication Data
US 2015/0298687 A1    Oct. 22, 2015

(51) Int. Cl.
*B60W 10/06* (2006.01)
*B60W 20/00* (2006.01)
*B60W 10/08* (2006.01)

(52) U.S. Cl.
CPC ........... *B60W 20/1082* (2013.01); *B60W 10/06* (2013.01); *B60W 10/08* (2013.01); *B60W 20/40* (2013.01); *B60W 2530/12* (2013.01); *B60W 2710/06* (2013.01); *B60W 2710/08* (2013.01); *Y10S 903/905* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 6,311,482 B1 | 11/2001 | Yamashita | |
| 8,073,610 B2 * | 12/2011 | Heap et al. ............. | B60K 6/445 123/406.23 |
| 2010/0162686 A1 | 7/2010 | Miyashita et al. | |

FOREIGN PATENT DOCUMENTS

| | | |
|---|---|---|
| JP | 2001-050086 A | 2/2001 |
| JP | 2002-097980 A | 4/2002 |
| JP | 2008-068802 A | 3/2008 |
| JP | 2010-038147 A | 2/2010 |

* cited by examiner

*Primary Examiner* — Redhwan K Mawari
*Assistant Examiner* — Edward Torchinsky
(74) *Attorney, Agent, or Firm* — Dinsmore & Shohl LLP

(57) ABSTRACT

The control apparatus of the present invention is applied to a hybrid vehicle having an internal combustion engine that is capable, during operation, of changing over its operational mode to lean combustion or to stoichiometric combustion. The control apparatus preferentially selects an operational mode having high system efficiency in relation to the requested power, and selects the stoichiometric combustion mode (S104) when, under the specific condition that the system efficiency is higher in the lean combustion mode as compared to the EV mode and moreover is lower in the stoichiometric combustion mode as compared to the EV mode, also the temperature (Tnc) of an exhaust purification catalyst is less than or equal to a first predetermined value (Tα) (S101, S102).

6 Claims, 7 Drawing Sheets

CONTROL APPARATUS OF HYBRID VEHICLE

TECHNICAL FIELD

The present invention relates to a control apparatus that is applied to a hybrid vehicle having an internal combustion engine that can change over to a lean combustion mode and to a stoichiometric combustion mode.

BACKGROUND ART

Per se known is a control apparatus that is applied to a hybrid vehicle including an internal combustion engine that can change over to a lean combustion mode and to a stoichiometric combustion mode and that incorporates an EGR device through which exhaust is circulated, a first motor-generator, and a second motor generator, and that, during execution of an EV mode in which combustion in the internal combustion engine is stopped and the vehicle travels by using the second motor-generator as a source of propulsion power, suppresses decrease of the temperature of an exhaust purification catalyst in the exhaust passage by circulating exhaust through the EGR device while motoring the internal combustion engine with the first motor-generator (refer to Patent Document #1). Apart from the above, Patent Documents #2 through #4 in the Citation List below may be considered to be relevant to the present invention.

CITATION LIST

Patent Literature

Patent Document #1: JP2010-38147A.
Patent Document #2: JP2001-50086A.
Patent Document #3: JP2008-68802A.
Patent Document #4: JP2002-97980A.

SUMMARY OF INVENTION

Technical Problem

The control apparatus of Patent Document #1 is able to suppress decrease of the temperature of the exhaust purification catalyst during execution of the EV mode. However, the system efficiency decreases somewhat during execution of the EV mode, since the first motor-generator consumes some electrical power due to its motoring of the internal combustion engine.

Accordingly, it is the object of the present invention to provide a control apparatus of a hybrid vehicle, that is capable of suppressing decrease of the temperature of an exhaust purification catalyst, while still keeping down the fuel consumption of the internal combustion engine.

Solution to Technical Problem

The control apparatus of the present invention is a control apparatus of a hybrid vehicle that is applied to a hybrid vehicle that comprises, as power sources for propulsion, an internal combustion engine that has an exhaust purification catalyst that purifies its exhaust and that can be changed over between lean combustion and stoichiometric combustion and an electric motor, and that is capable of operating in a plurality of modes including an EV mode in which the internal combustion engine is stopped and the electric motor is driven, a lean combustion mode in which the internal combustion engine is operated with the lean combustion, and a stoichiometric combustion mode in which the internal combustion engine is operated with the stoichiometric combustion; and comprising a mode selection device configured to select preferentially, from the plurality of modes, that mode for which the system efficiency in relation to the requested power is the highest; wherein, under a condition that the system efficiency is higher for the lean combustion mode as compared to the EV mode and moreover is lower for the stoichiometric combustion mode as compared to the EV mode, the mode selection device selects the stoichiometric combustion mode when the temperature of the exhaust purification catalyst is less than or equal to a first predetermined value.

According to the control apparatus of the present invention, it becomes possible to operate the hybrid vehicle with good efficiency, since the mode in which the system efficiency in relation to the requested power is high is preferentially selected. Since the exhaust temperature during lean combustion is lower as compared to stoichiometric combustion, accordingly the temperature of the exhaust purification catalyst decreases when the lean combustion mode is implemented. Under the condition that the system efficiency is higher for the lean combustion mode as compared to the EV mode, and is lower for the stoichiometric combustion mode as compared to the EV mode, the priority order of mode selection on the basis of the system efficiency becomes: the lean combustion mode, the EV mode, and the stoichiometric combustion mode. If, in this situation, the temperature of the exhaust purification catalyst becomes less than or equal to the first predetermined value, then, if the lean combustion mode or the EV mode is selected according to the above priority order based upon system efficiency, this invites yet further decrease of the temperature of the exhaust purification catalyst. However, with the control apparatus according to the present invention, in the case of this type of condition, if the temperature of the exhaust purification catalyst becomes less than or equal to the first predetermined value, then the priority order based upon system efficiency is not followed, but instead the stoichiometric combustion mode is selected. Accordingly it is possible to suppress decrease of the temperature of the exhaust purification catalyst, since, due to selection of the stoichiometric combustion mode, the exhaust temperature becomes higher than during other modes. Under the condition described above, if the temperature of the exhaust purification catalyst has become lower than the first predetermined value, the control apparatus of the present invention selects the stoichiometric combustion mode in which the system efficiency is lower than in the EV mode. Due to this, the fuel consumption of the internal combustion engine is increased for a short time interval, as compared to what it would be if, in the same circumstances, the EV mode were to be selected. However, the intervals in which the lean combustion mode can be implemented are increased by suppressing reduction of the temperature of the exhaust purification catalyst due to selection of the stoichiometric combustion mode. Accordingly, it is possible to keep down the fuel consumption of the internal combustion engine over the long term. Thus, it is possible to prevent reduction of the temperature of the exhaust purification catalyst while still keeping down the fuel consumption of the internal combustion engine.

As one aspect of the control apparatus of the present invention, the mode selection device may select the EV mode if, under the condition, the temperature of the exhaust purification catalyst becomes less than or equal to a second predetermined value that is lower than the first predetermined value. For example, in a case when the external air temperature is lower than the normal air temperature or in a case of high speed travel in which the flow rate of the air current due to vehicle motion is high, there is a possibility that the temperature of the exhaust purification catalyst will drop even if the stoichiometric combustion mode is selected. In this type of case, rather than continuing implementation of the stoichiometric combustion mode, the EV mode in which priority is given to the system efficiency is selected, and thereafter it becomes advantageous from the standpoint of system efficiency to elevate the temperature of the exhaust purification catalyst forcibly by any method.

For example, it would also be possible for the internal combustion engine to be further provided with a three-way catalyst whose capacity is less than that of the exhaust purification catalyst, and to further provide a catalyst temperature rise control device configured to implement catalyst temperature rise control in which the temperature of the exhaust purification catalyst and the temperature of the three-way catalyst are forcibly elevated if the temperature of this three-way catalyst has become less than or equal to the lower limit value of the temperature range in which the three-way catalyst activates.

As one aspect of the control apparatus of the present invention, an NOx catalyst may be provided as the exhaust purification catalyst, and the lower limit value of the temperature range in which the NOx catalyst activates is set as the first predetermined value. According to this aspect, it is easy to maintain the temperature of the NOx catalyst within the temperature range in which the NOx catalyst activates.

It should be understood that, with the control apparatus of the present invention, the meaning of the term "stoichiometric combustion" includes, not only combustion that takes as its target an air/fuel ratio that agrees precisely with the theoretical air/fuel ratio, but also includes combustion that takes as its target an air/fuel ratio that is in the vicinity of the theoretical air/fuel ratio. Moreover, the term "lean combustion" means combustion that takes as its target a value of air/fuel ratio that is greater than the air/fuel ratio that is taken as the target during stoichiometric combustion, in other words an air/fuel ratio on the lean side.

DESCRIPTION OF EMBODIMENTS

Embodiment #1

Figure 1:
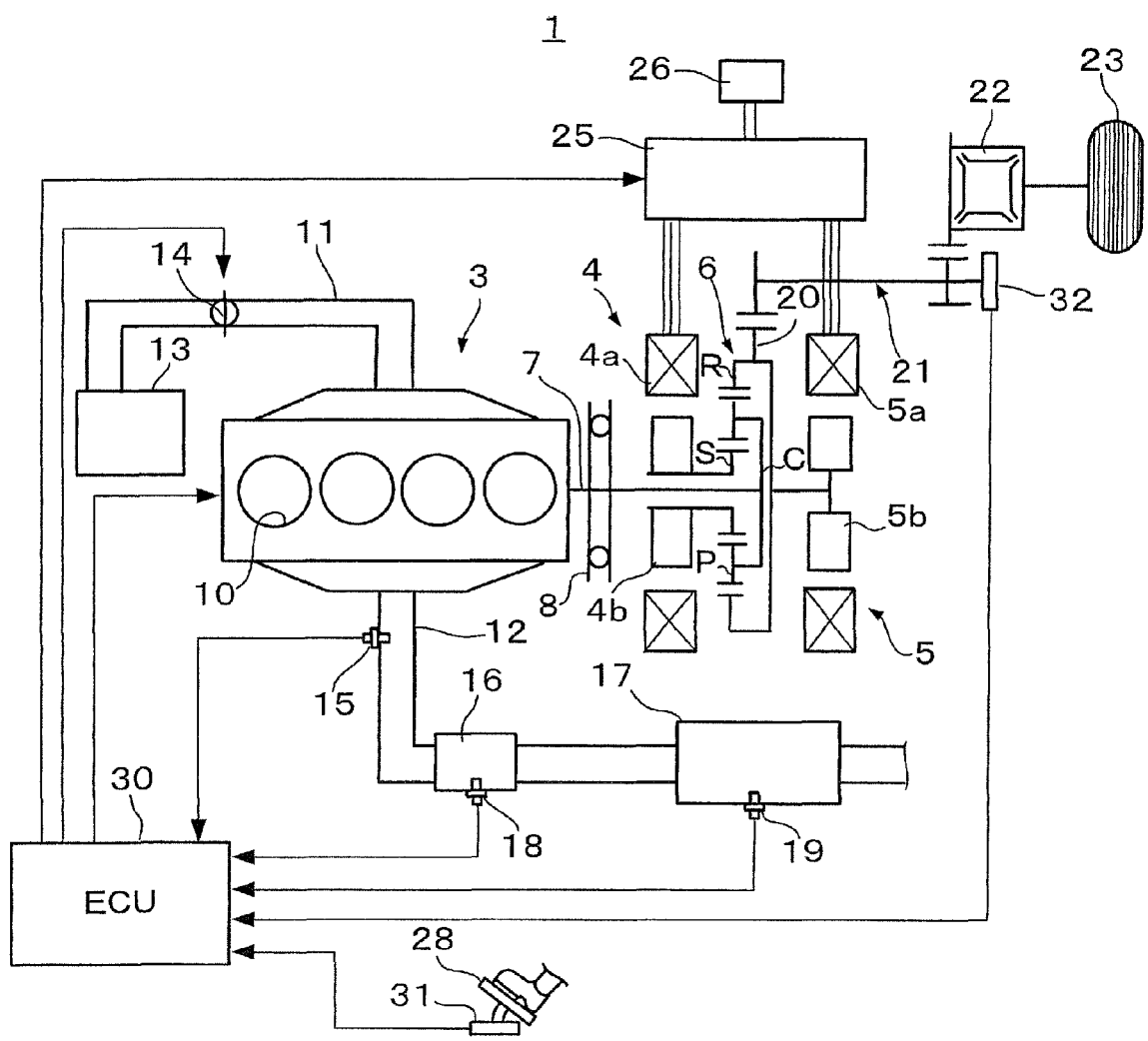
FIG. 1 is a figure showing the overall structure of a vehicle to which a control apparatus according to an embodiment of the present invention is applied.

As shown in FIG. 1, a vehicle 1 is constructed as a hybrid vehicle in which a plurality of power sources are combined. As power sources for propulsion, this vehicle 1 comprises an internal combustion engine 3 and two motor-generators 4 and 5 that function as electric motors. The internal combustion engine 3 has four cylinders 10, and is an in line type four cylinder internal combustion engine. An intake passage 11 and an exhaust passage 12 are connected to each of the cylinders 10. An air cleaner 13 for air filtation and a throttle valve 14 that is capable of regulating the flow amount of intake air are provided to the intake passage 11. And an A/F sensor 15 that outputs a signal corresponding to the air/fuel (A/F) ratio of the internal combustion engine 3 is provided in the exhaust passage 12. Moreover, a start catalyst 16 and an NOx catalyst 17 that purify harmful components in the exhaust are provided to the exhaust passage 12. The start catalyst 16, which is upstream in the exhaust passage 12, is constructed as a three-way catalyst. This start catalyst 16 has a smaller capacity than the NOx catalyst 17 which is downstream therefrom, and principally functions as a catalyst that purifies the exhaust during starting of the internal combustion engine 3. And the NOx catalyst 17, which also serves as an exhaust purification catalyst, is an NOx catalyst of a per se known occlusion reduction type. In order to detect the temperatures of these two catalysts 16 and 17, a temperature sensor 18 is provided to the start catalyst 16 and a temperature sensor 19 is provided to the NOx catalyst 17.

A power splitting mechanism 6 is connected to the internal combustion engine 3 and to the first motor-generator 4. The output of this power splitting mechanism 6 is transmitted to an output gear 20. The output gear 20 and the second motor-generator 5 are mutually linked together and rotate as one. The power outputted from the output gear 20 is transmitted to drive wheels 23 via a deceleration device 21 and a differential device 22. The first motor-generator 4 has a stator 4a and a rotor 4b. The first motor-generator 4 can function as a generator by receiving power from the internal combustion engine 3 split by the power splitting mechanism 6 and by generating electrical power, and also can function as an electric motor by being driven by AC electrical power. In a similar manner, the second motor-generator 5 has a stator 5a and a rotor 5b, and can function either as an electric motor or as a generator. Both of the motor-generators 4 and 5 are connected to a battery 26 via a motor controller 25. The motor controller 25 converts electrical power generated by the motor-generators 4 and 5 into DC power which is stored in the battery 26, and also converts electrical power from the battery 26 into AC power which is supplied to the motor-generators 4 and 5.

The power splitting mechanism 6 is constructed as a single pinion type planetary gear mechanism, and comprises a sun gear S, a ring gear R, and a planetary carrier C that carries a pinion P that is meshed with these gears S and R so as to be capable of both rotating and revolving. The sun gear S is linked to the rotor 4a of the first motor-generator 4, and the ring gear R is linked to the output gear 20, while the planetary gear C is linked to a crankshaft 7 of the internal combustion engine 3. It should be understood that a damper 8 is interposed between the crankshaft 7 and the planetary carrier C, and this damper 8 absorbs torque fluctuations of the internal combustion engine 3.

Control of the vehicle 1 is performed by an electronic control unit 30 (i.e. an ECU). This ECU 30 performs various types of control related to the internal combustion engine 3 and to the motor-generators 4 and 5. In the following, the main types of control performed by the ECU 30 corresponding to the present invention will be explained. The ECU 30 controls the vehicle 1 while changing over between various modes, so as to keep the power system efficiency in relation to the power requested by the driver at optimum. For example, in the low load region in which the thermal efficiency of the internal combustion engine 3 drops, an EV mode is selected, in which combustion by the internal combustion engine 3 is stopped and the second motor-generator 5 is driven. Moreover, if the amount of torque provided only by the internal combustion engine 3 is insufficient, then a hybrid mode is selected, in which, along with the internal combustion engine 3, at least one of the first motor-generator 4 and the second motor-generator 5 is employed as a source of propulsion power for traveling.

The operational mode of the internal combustion engine 3 can be changed over between stoichiometric combustion in which the theoretical air/fuel ratio and an air/fuel ratio in the vicinity thereof are taken as target, and lean combustion in which an air/fuel ratio that is set more toward the lean side from the target air/fuel ratio for stoichiometric combustion is taken as target. The ECU 30 measures the air/fuel ratio by referring to the value outputted from the A/F sensor 15, and performs feedback control so as to reduce the deviation of this actual air/fuel ratio from the target air/fuel ratio. Since in lean combustion the air/fuel ratio which is taken as the target is higher than the air/fuel ratio which is taken as the target during stoichiometric combustion, accordingly in this operation mode it is possible to reduce the amount of fuel consumed, as compared to the case when stoichiometric combustion is maintained. Here, the hybrid mode in which the internal combustion engine 3 is operated at lean combustion will be termed the "lean combustion mode", while the hybrid mode in which the internal combustion engine 3 is operated at stoichiometric combustion will be termed the "stoichiometric combustion mode".

The selection of each of these modes is performed on the basis of the power system efficiency in relation to the requested power. The system efficiency is a parameter that is determined in consideration of various factors, such as the amounts of electrical power consumed by the motor-generators 4 and 5, the amount of fuel consumed by the internal combustion engine 3 and its thermal efficiency, the electrical efficiencies of the motor-generators 4 and 5, and so on. While the details of the method by which the system efficiency is calculated will here be omitted, this calculation may be performed by the ECU 30 according to a per se known method.

Figure 2:
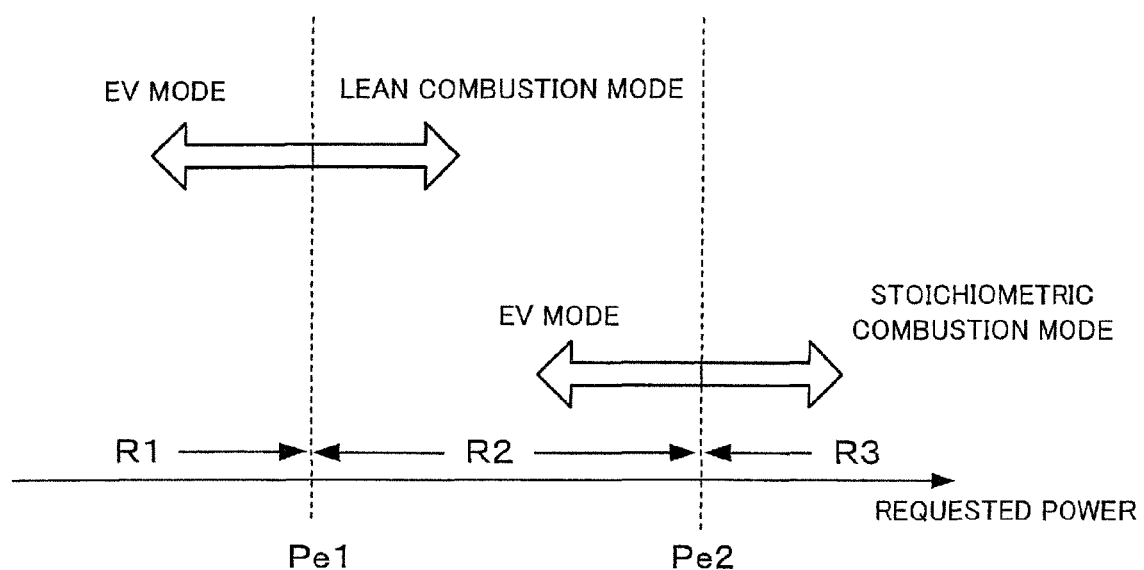
FIG. 2 is a figure showing a relationship between operational mode efficiency branch points and requested power.

As shown in FIG. 2, system efficiency branch points Pe1 and Pe2 may be defined between the EV mode and the hybrid modes. In a situation in which the requested power is higher than the efficiency branch point Pe1 between the lean combustion mode and the EV mode, the system efficiency is higher if the lean combustion mode is selected than if the EV mode is selected. Conversely, in a situation in which the requested power is lower than the efficiency branch point Pe1, the system efficiency is higher if the EV mode is selected than if the lean combustion mode is selected. Moreover, in a situation in which the requested power is higher than the efficiency branch point Pe2 between the stoichiometric combustion mode and the EV mode, the system efficiency is higher if the stoichiometric combustion mode is selected than if the EV mode is selected. Conversely, in a situation in which the requested power is lower than the efficiency branch point Pe2, the system efficiency is higher if the EV mode is selected than if the stoichiometric combustion mode is selected.

The requested power can be considered as falling into any one of three regions R1, R2, and R3, according to the two efficiency branch points Pe1 and Pe2. In the region R1, when the modes are arranged in the order of decreasing system efficiency, the resulting order is: the EV mode, the lean combustion mode, and the stoichiometric combustion mode. In the region R2, when the modes are arranged in the order of decreasing system efficiency, the resulting order is: the lean combustion mode, the EV mode, and the stoichiometric combustion mode. And in the region R3, when the modes are arranged in the order of decreasing system efficiency, the resulting order is: the stoichiometric combustion mode, the EV mode, and the lean combustion mode.

In principle, the ECU 30 performs control so as preferentially to select that mode, from the plurality of modes, for which the efficiency in relation to the requested power is the highest. For example, if the requested power is in the region R1, then the ECU 30 selects the EV mode at highest priority, and, if it is not possible to select the EV mode for some reason such as the electrical storage level of the battery 26 being low or the like, then the ECU 30 selects the lean combustion mode, which is the one for which the system efficiency is the next highest. This embodiment is particularly distinguished by the control that is implemented in the case that corresponds to the requested power being in the region R2. To put it in another manner, this embodiment is particularly distinguished by the control that is implemented in the case of the specific condition that, in relation to the requested power, the system efficiency is higher for the lean combustion mode as compared to the EV mode, and moreover the system efficiency is lower for the stoichiometric combustion mode as compared to the EV mode. This specific condition corresponds to the "condition" of the Claims.

Figure 3:
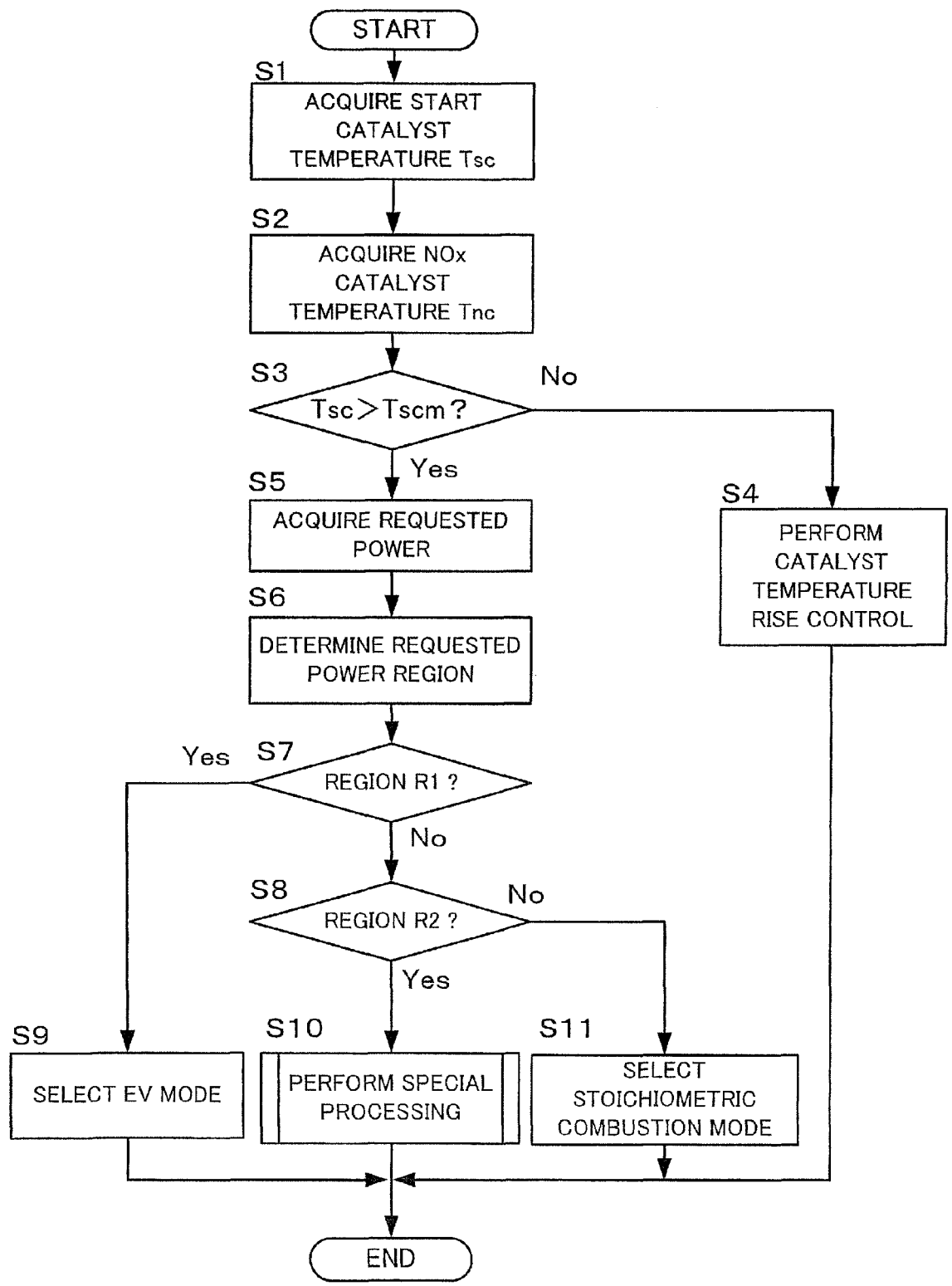
FIG. 3 is a flow chart showing an example of a control routine according to an embodiment of the present invention.

An example of the control performed by the ECU 30 will now be explained with reference to FIG. 3 and FIG. 4. The program of the control routine of FIG. 3 is stored in the ECU 30, and is read out at an appropriate timing and repeatedly executed on a predetermined cycle. First, in a step S1, the ECU 30 refers to the signal outputted from the temperature sensor 18, and acquires the temperature Tsc of the start catalyst 16. And next, in a step S2, the ECU 30 refers to the signal outputted from the temperature sensor 19, and acquires the temperature Tnc of the NOx catalyst 17. It should be understood that, instead of the temperature sensors 18 and 19, it would also be possible to acquire at least one of the temperatures Tsc and Tnc by estimation from the operational state of the internal combustion engine 3.

Then in a step S3 the ECU 30 makes a decision as to whether or not the temperature Tsc of the start catalyst 16 is higher than the lower limit value Tscm of the temperature range at which the catalyst activates. If the temperature Tsc is higher than the lower limit value Tscm, then the flow of control is transferred to a step S5. But if the temperature Tsc is less than or equal to the lower limit value Tscm, then the flow of control proceeds to a step S4, in which catalyst temperature rise control is implemented so as forcibly to elevate the temperatures of both the start catalyst 16 and the NOx catalyst 17. In this embodiment, this catalyst temperature rise control is implemented by operating the internal combustion engine 3 in the stoichiometric combustion mode and moreover at high load.

In the step S5, the ECU 30 acquires the requested power. The ECU 30 acquires the requested power by referring to the output signal of an accelerator opening amount sensor 31 that outputs a signal corresponding to the amount by which an accelerator pedal 28 is stepped upon and to the output signal of a vehicle speed sensor 32 that outputs a signal corresponding to the vehicle speed, and by calculating the power by a predetermined method. Then in a step S6 the ECU 30 makes a decision as to which of the regions R1 through R3 shown in FIG. 2 the requested power that was acquired in the step S5 belongs. And then, if it is decided in a step S7 that the requested power belongs to the region R1, then the flow of control is transferred to a step S9 in which the EV mode is selected, for which the system efficiency in relation to the requested power is the highest. Moreover, if it is decided in a step S8 that the requested power belongs to the region R2, then the flow of control is transferred to a step S10 in which special processing shown in FIG. 4 is implemented. But if a negative decision is reached in the step S8, then, since the requested power belongs to the region R3, the flow of control is transferred to a step S11 in which the stoichiometric combustion mode is selected, for which the system efficiency in relation to the requested power is the highest.

Figure 4:
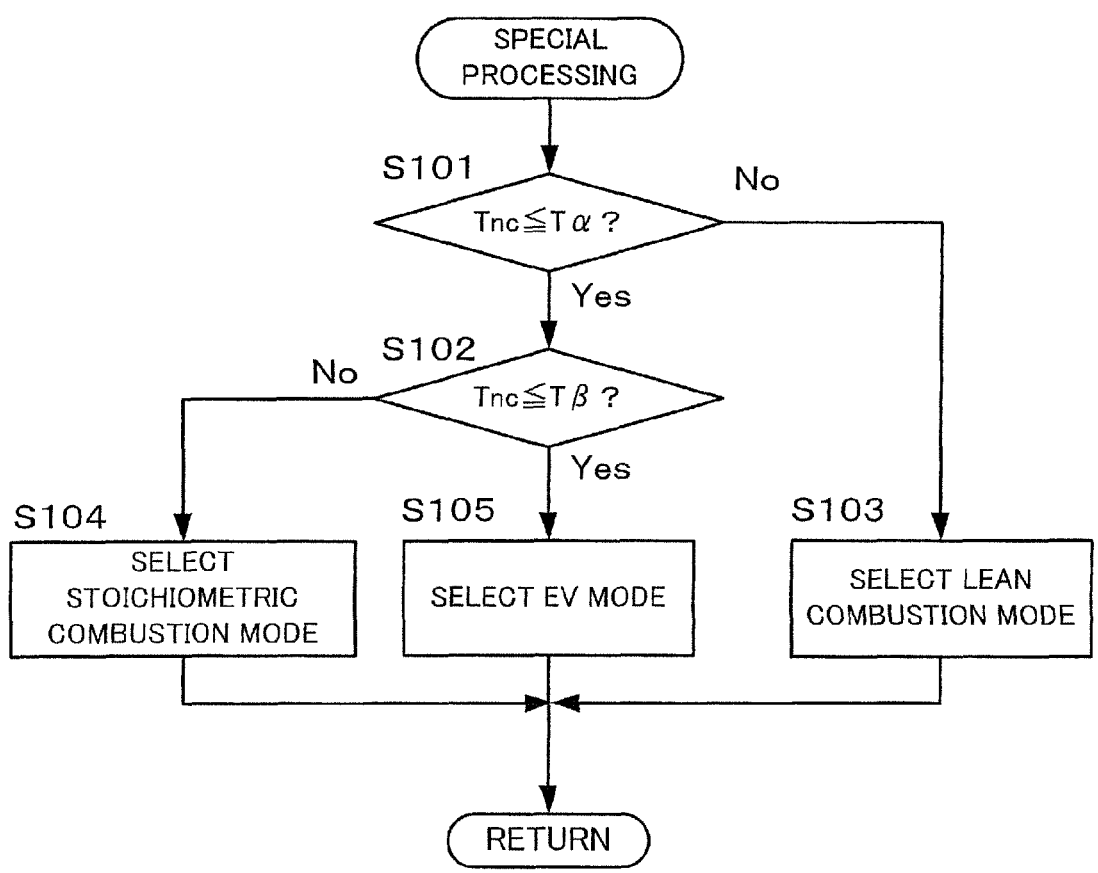
FIG. 4 is a flow chart showing an example of special processing according to a first embodiment of the present invention.

In a step S101 of FIG. 4, the ECU 30 makes a decision as to whether or not the temperature Tnc of the NOx catalyst 17 is less than or equal to a first predetermined value Tα. This first predetermined value Tα is set to the lower limit value of the temperature range in which the NOx catalyst 17 activates. It should be understood that, in consideration of stability of control, it would also be acceptable to arrange to set the first predetermined value Tα to a temperature that is a little higher than the lower limit value of the temperature range in which the NOx catalyst 17 activates. If the temperature Tnc of the NOx catalyst 17 is less than or equal to the first predetermined value Tα, then the flow of control proceeds to a step S102. But if the temperature Tnc of the NOx catalyst 17 is higher than the first predetermined value Tα, in other words if the temperature Tnc of the NOx catalyst 17 is within the temperature range for activation, then the flow of control is transferred to a step S103 in which the lean combustion mode is selected, for which the system efficiency in relation to the requested power is the highest.

In the step S102, the ECU 30 makes a decision as to whether or not the temperature Tnc of the NOx catalyst 17 is less than or equal to a second predetermined value Tβ which is lower than the first predetermined value Tα. If the temperature Tnc of the NOx catalyst 17 is not less than or equal to the second predetermined value Tβ, then the temperature Tnc of the NOx catalyst 17 is in the vicinity of the lower limit value of the temperature range for activation. Due to this, quick recovery of the temperature Tnc of the NOx catalyst 17 to its temperature range for activation may be anticipated by selection of the stoichiometric combustion mode. Accordingly, if the temperature Tnc of the NOx catalyst 17 is less than or equal to the first predetermined value Tα but is not less than or equal to the second predetermined value Tβ, then the ECU 30 transfers the flow of control to the step S104 and selects the stoichiometric combustion mode. Here, it is possible to make the temperature of the NOx catalyst rise by selecting the stoichiometric combustion mode, even though the system efficiency is lower than if the EV mode were to be selected.

On the other hand, if the temperature Tnc of the NOx catalyst 17 is less than or equal to the second predetermined value Tβ, then the temperature Tnc of the NOx catalyst 17 is well below the lower limit value Tα of the temperature range for activation. In this type of case, it would not be possible to anticipate quick recovery of the temperature Tnc of the NOx catalyst 17 to its temperature range for activation, even if selection of the stoichiometric combustion mode were to be continued. Due to this, if the temperature Tnc of the NOx catalyst 17 is less than or equal to the second predetermined value Tβ, then the flow of control is transferred to a step S105 and the EV mode is selected. In this case, while the temperature Tnc of the NOx catalyst 17 will drop to lower than its present temperature when the EV mode is selected, nevertheless, even though this temperature Tnc drops, it will be possible to recover afterward to the activation temperature by executing the catalyst temperature rise control in the step S4 of FIG. 3 described above. Accordingly in this case priority is given to system efficiency, and the EV mode is selected in which the system efficiency is higher than in the stoichiometric combustion mode.

As described above, due to the ECU 30 executing the control routine of FIGS. 3 and 4, the ECU 30 functions as the "mode selection device" of the Claims. Moreover, due to executing the step S4 of FIG. 3, the ECU 30 functions as the "catalyst temperature rise control device" of the Claims.

Figures 5A, 5B:
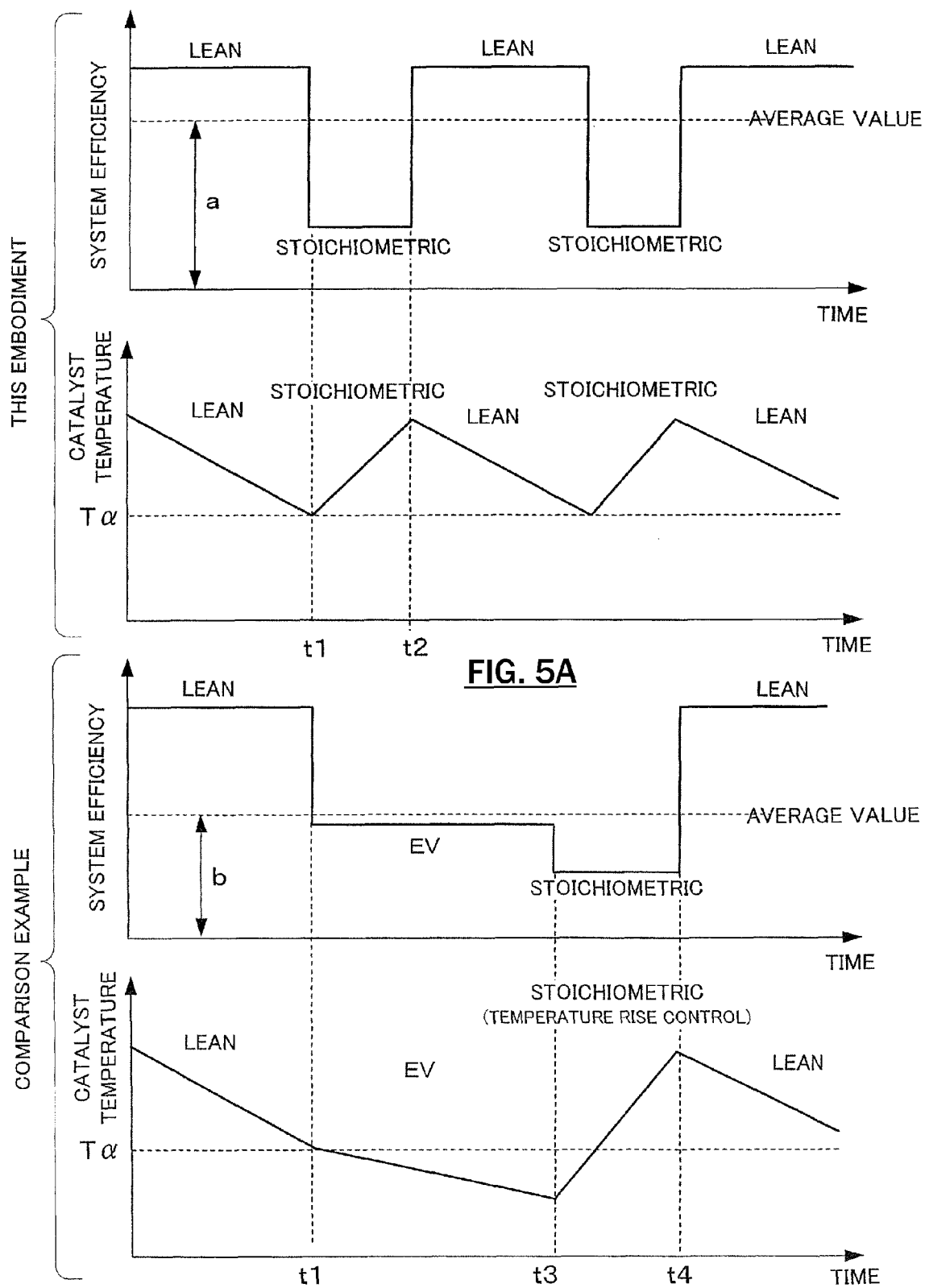
FIG. 5A is a timing chart showing an example of control results.
FIG. 5B is a timing chart showing control results of a comparison example.

Next, with reference to FIG. 5A, an example of change over time of the system efficiency and the temperature Tnc of the NOx catalyst 17 when the control of this embodiment is implemented under the specific condition that the requested power belongs to the region R2 will be explained along with a comparison example as shown in FIG. 5B. The comparison example of FIG. 5B is a case in which control is implemented to give priority to system efficiency and to select the EV mode in which the system efficiency is the next highest after the lean combustion mode when, in the case of the specific condition, the temperature Tnc of the NOx catalyst 17 has become less than or equal to the first predetermined value Tα. In other words, the control of this comparison example is equivalent to a case in which the step S102 and the step S104 of FIG. 4 are omitted.

As shown in FIG. 5A, with this embodiment, if the specific condition holds, the lean combustion mode is selected when the temperature Tnc of the NOx catalyst 17 is higher than the first predetermined value Tα. As a result of the lean combustion mode having been selected, the temperature Tnc of the NOx catalyst 17 gradually decreases, and reaches the first predetermined value Tα at a time point t1. And, when the temperature Tnc reaches the first predetermined value Tα, the stoichiometric combustion mode is selected and the exhaust temperature rises. Due to this, the temperature Tnc of the NOx catalyst 17 rises, and at a time point t2 the system changes over to the lean combustion mode. Subsequently, in a similar manner, the lean combustion mode and the stoichiometric combustion mode are alternatingly implemented. When control is performed in this manner, the average value of the system efficiency becomes "a".

By contrast, with the comparison example of FIG. 5B, the EV mode is selected at the time point t1 that the temperature Tnc of the NOx catalyst 17 has reached the first predetermined value Tα. The system efficiency when the EV mode is selected becomes higher than when the stoichiometric combustion mode is selected. However, in the EV mode, the temperature Tnc of the NOx catalyst 17 gradually drops, because the internal combustion engine 3 is stopped. When the EV mode continues, the temperature Tsc of the start catalyst 16 also drops along with the temperature Tnc of the NOx catalyst 17. And when, at a time point t3, the temperature Tsc of the start catalyst 16 reaches the lower limit value Tscm of its temperature range for activation, catalyst temperature rise control is implemented (refer to the step S4 of FIG. 3). Due to this catalyst temperature rise control, the temperature Tnc of the NOx catalyst 17 switches to rising. And at a time point t4 the catalyst temperature rise control is stopped and the operational mode is changed over to the lean combustion mode. In the case of this comparison example, the average value of the system efficiency becomes "b". This average value "b" for the comparison example is lower than the average value "a" for this embodiment of the present invention.

Accordingly it is seen that, in the example shown in FIG. 5A, when the specific condition is satisfied, the system efficiency is higher when the control according to this embodiment is implemented, as compared to when the control of the comparison example is implemented as shown in FIG. 5B. Moreover, as can be understood from FIG. 5A, in the case of the specific condition that the requested power belongs to the region R2, when the control of this embodiment is implemented, the interval in which it is possible to implement the lean combustion mode becomes longer than when the control of the comparison example is implemented as shown in FIG. 5B. Due to this, while with the present embodiment the fuel consumption is increased for a short interval by selecting the stoichiometric combustion mode instead of the EV mode, over the long term, due to the interval of implementation of the lean combustion mode increasing, it is possible to keep down the fuel consumption of the internal combustion engine 3.

Figures 6A, 6B:
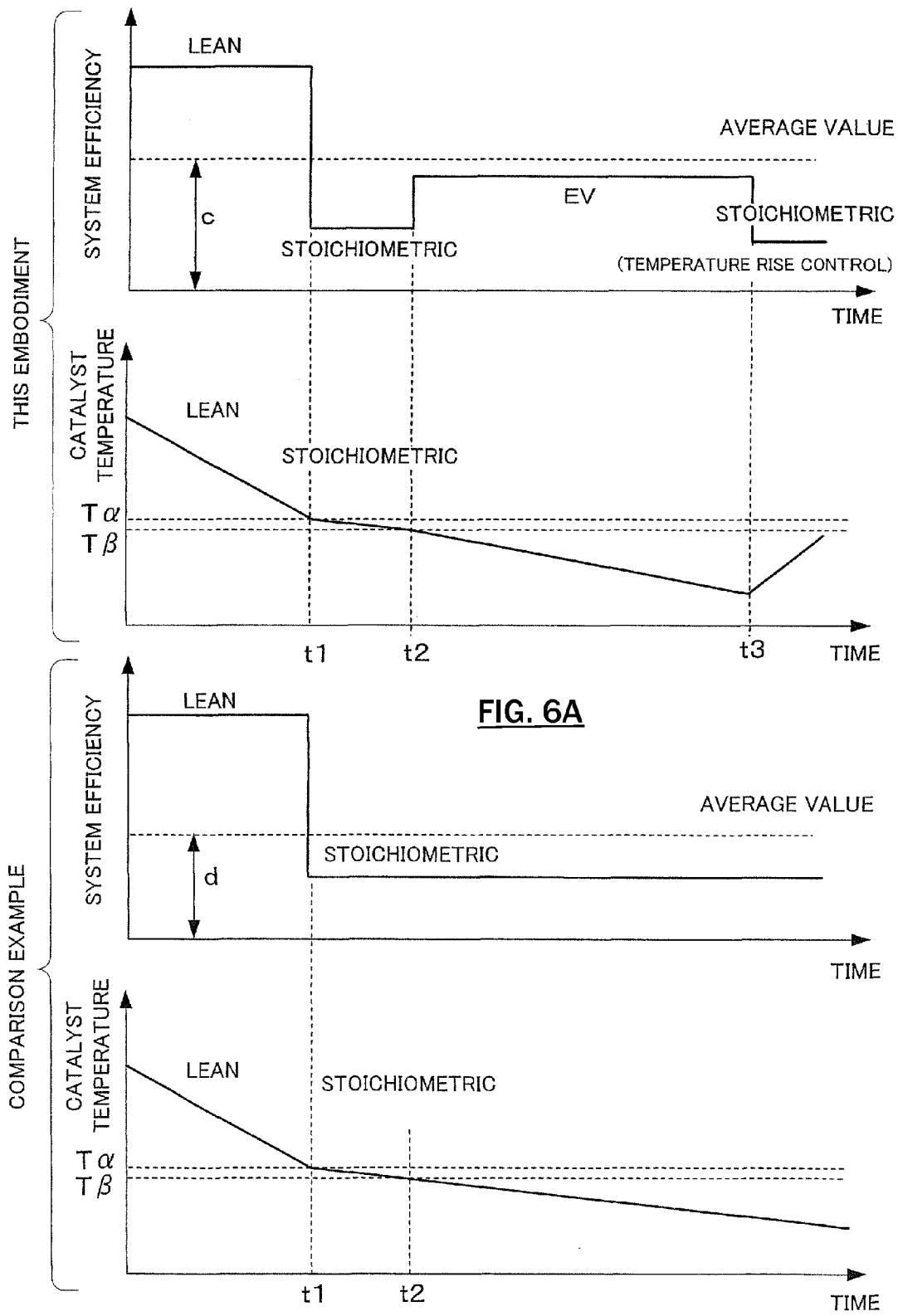
FIG. 6A is a timing chart showing another example of control results.
FIG. 6B is a timing chart showing control results of another comparison example.

Next, with reference to FIG. 6A, another example of change over time of the system efficiency and the temperature Tnc of the NOx catalyst 17 when the control of this embodiment is implemented under the specific condition that the requested power belongs to the region R2 will be explained along with a comparison example shown in FIG. 6B. The case of FIG. 6A is one in which the control of this embodiment and control of a comparison example are implemented with the surrounding environment of the vehicle 1 being different from that in the case of FIG. 5A, i.e. with the vehicle traveling in a surrounding environment in which the temperature of the NOx catalyst 17 continues to drop even though the stoichiometric combustion mode is selected, such as for example in a case when the external air temperature is lower than the normal air temperature or in a case of high speed travel in which the flow rate of the air current due to vehicle motion is high. The comparison example of FIG. 6B is a case in which, when the specific condition is satisfied, even though the temperature Tnc of the NOx catalyst 17 is less than or equal to the second predetermined value Tβ, still control is implemented to select the stoichiometric combustion mode. In other words, the control of the comparison example of FIG. 6B is equivalent to a case in which the step S102 and the step S105 of FIG. 4 are omitted.

As shown in FIG. 6A, with this embodiment, if the specific condition is satisfied, the lean combustion mode is selected when the temperature Tnc of the NOx catalyst 17 is higher than the first predetermined value Tα. Due to this, the temperature Tnc of the NOx catalyst 17 gradually decreases, and reaches the first predetermined value Tα at a time point t1. And, when the temperature Tnc reaches the first predetermined value Tα, the stoichiometric combustion mode is selected and the exhaust temperature rises. However, the situation in FIG. 6A is different from the situation in FIG. 5A, because the amount of heat dissipation from the exhaust passage of the internal combustion engine 3 and from the two catalysts is high. Due to this, the temperature Tnc of the NOx catalyst 17 does not increase; rather, this temperature Tnc continues to decrease, although the rate of decrease is lower than during the interval before the time point t1. When the temperature Tnc of the NOx catalyst 17 decreases further and reaches the second predetermined value Tβ at the time point t2, then the EV mode is selected. Due to this selection of the EV mode, the system efficiency becomes higher as compared to what it would be if the stoichiometric combustion mode were to be continued. When the EV mode continues, along with the temperature Tnc of the NOx catalyst 17 dropping, the temperature Tsc of the start catalyst 16 also drops. And, when the temperature of the start catalyst 16 reaches the lower limit value Tscm of the temperature range for activation at a time point t3, catalyst temperature rise control is implemented (refer to the step S4 of FIG. 3). Due to this catalyst temperature rise control, the temperature Tnc of the NOx catalyst 17 switches to rising. And thereafter opportunities for selecting the lean combustion mode are available.

By contrast, with the comparison example of FIG. 6B, the stoichiometric combustion mode is selected at the time point t1, and the stoichiometric combustion mode is continued even if the temperature Tnc of the NOx catalyst 17 becomes less than or equal to the second predetermined value Tβ. The rate of decrease of the NOx catalyst temperature Tnc is higher when the EV mode is selected than when the stoichiometric combustion mode is selected. To put this in another manner, the temperature Tnc of the NOx catalyst 17 can drop more easily when the EV mode is selected, as compared to when the stoichiometric combustion mode is selected. Due to this, in the case of the comparison example, the speed of decrease of the temperature Tnc of the NOx catalyst 17 is slower, so that the timing of execution of catalyst temperature rise control is delayed to be later than in the case of this embodiment. Accordingly, in the comparison example, opportunities for selection of the lean combustion mode are not available at the same intervals as in the case of this embodiment. Moreover, since the EV mode is not selected during the interval until the catalyst temperature rise control is implemented, accordingly the average value "d" of the system efficiency becomes lower than the average value "c" for the system efficiency in the case of this embodiment.

Accordingly in the situation shown in FIG. 6A, although the system changes over to the EV mode if the temperature Tnc of the NOx catalyst 17 has become less than or equal to the second predetermined value Tβ, this is more advantageous from the point of view of system efficiency than if the stoichiometric combustion mode were to be continued without any change.

Embodiment #2

Next, a second embodiment of the present invention will be explained with reference to FIG. 7. Except for the special processing that is implemented if the specific condition is satisfied, this second embodiment is the same as the first embodiment. In the following, the distinguishing portion of the second embodiment will be explained, while portions that are the same as the first embodiment will be omitted. The ECU 30 repeatedly executes the control routines of FIG. 3 and FIG. 7 on a predetermined cycle. The programs for these control routines are stored in the ECU 30, and are readout at appropriate timings and repeatedly executed on a predetermined cycle. By the ECU 30 repeatedly executing these control routines, the ECU 30 functions as the "mode selection device" of the Claims. Moreover, by the ECU 30 executing the step S4 of FIG. 3, the ECU 30 functions as the "catalyst temperature rise control device" of the Claims.

Figure 7:
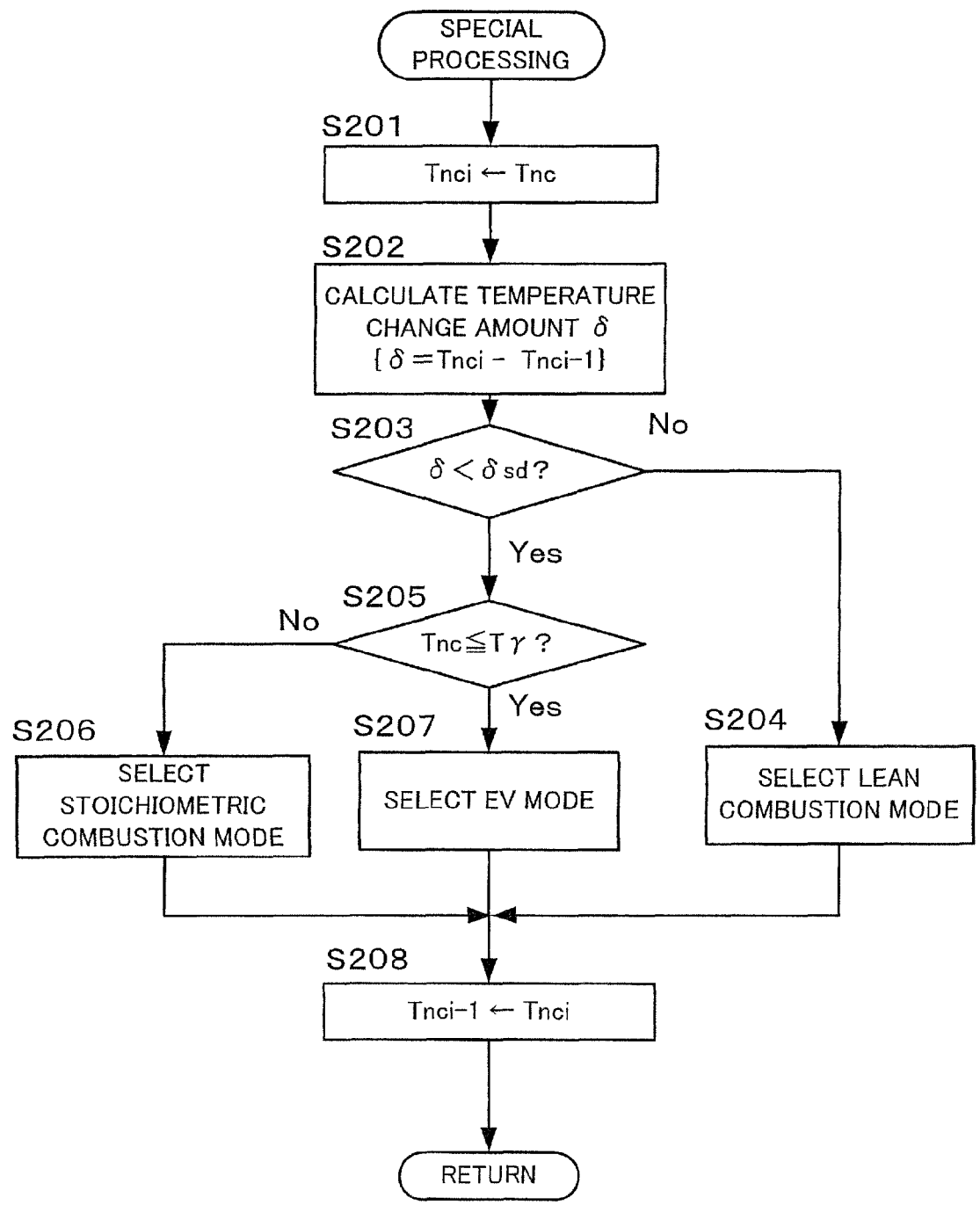
FIG. 7 is a flow chart showing an example of special processing according to a second embodiment of the present invention.

As shown in FIG. 7, in a step S201, the ECU 30 substitutes the value of the temperature Tnc of the NOx catalyst 17 that was acquired in the step S2 of FIG. 3 with a temperature variable Tnci to be used in this cycle of the routine. Then in a step S202 the ECU 30 calculates the amount of change δ of the temperature Tnc of the NOx catalyst 17. This amount of temperature change δ is calculated by subtracting the value of the temperature variable Tnci−1 that was used in the previous cycle of this routine from the current value of the temperature variable Tnci. It should be understood that this temperature variable Tnci−1 is updated to the value of the temperature variable Tnci in a step S208 that will be described hereinafter.

Then in a step S203 the ECU 30 makes a decision as to whether or not the amount of temperature change δ is smaller than a threshold value δsd. This threshold value δsd is a predetermined negative value. Accordingly, by the processing of this step S203, it is possible to determine whether or not the temperature Tnc of the NOx catalyst 17 has changed in the reduction direction at greater than or equal to a predetermined rate of change. If the temperature Tnc of the NOx catalyst 17 has changed in the reduction direction at greater than or equal to the predetermined rate of change, then this situation is handled like the case in the first predetermined embodiment in which the temperature Tnc is less than or equal to the first predetermined value Tα. If the amount of temperature change δ is smaller than the threshold value δds, then the flow of control is transferred to a step S205. On the other hand, if the amount of temperature change δ is greater than or equal to the threshold value δds, then the temperature Tnc of the NOx catalyst 17 is not changing in the reduction direction at greater than or equal to the predetermined rate of change. Accordingly the flow of control is transferred to a step S204 in which the lean combustion mode is selected, since there is no obstacle to selecting the lean combustion mode in which the system efficiency in relation to the requested power is the highest.

In the step S205, the ECU 30 makes a decision as to whether or not the temperature Tnc of the NOx catalyst 17 is less than or equal to a predetermined value Tγ. This predetermined value Tγ is a value that is lower than the first predetermined value Tα explained for the first embodiment. Accordingly, this predetermined value Tγ is a lower value than the lower limit value of the temperature range for activation of the NOx catalyst 17. This predetermined value Tγ may be the same value as the second predetermined value Tβ explained in connection with the first predetermined embodiment, or may be a different value. If the temperature Tnc of the NOx catalyst 17 is not less than or equal to the predetermined value Tγ, then it may be anticipated that the temperature Tnc of the NOx catalyst 17 will recover quickly due to selection of the stoichiometric combustion mode. Accordingly, if the temperature Tnc of the NOx catalyst 17 is not less than or equal to the predetermined value Tγ, then the flow of control is transferred to a step S206, in which the ECU 30 selects the stoichiometric combustion mode. Here, by selecting the stoichiometric combustion mode, it is possible for the temperature of the NOx catalyst to rise, although the system efficiency is lower than when the EV mode is selected.

On the other hand, if the temperature Tnc of the NOx catalyst 17 is less than or equal to the predetermined value Tγ, then, even if the selection of the stoichiometric combustion mode is continued, it is not possible to anticipate quick recovery of the temperature Tnc of the NOx catalyst 17 to its temperature range for activation. Due to this, if the temperature Tnc of the NOx catalyst 17 is less than or equal to the predetermined value Tγ, then the flow of control is transferred to a step S207, in which the ECU 30 selects the EV mode. Here, although the temperature Tnc of the NOx catalyst 17 drops below the current value when the EV mode is selected, even if the temperature Tnc decreases, still it is subsequently possible to recover the temperature Tnc to the activation temperature by executing the catalyst temperature rise control of the step S4 of FIG. 3. Accordingly, here, priority is given to system efficiency, and the EV mode is selected in which the system efficiency is higher than in the stoichiometric combustion mode.

Finally, in a step S208, the ECU 30 substitutes the value of the temperature variable Tnci that has been used in this cycle of the routine for the temperature variable Tnci−1. And this value of the temperature variable Tnci−1 is stored for the processing of the step S202 to be executed in the next cycle of the routine.

Since, according to the control of this second embodiment, when the temperature Tnc of the NOx catalyst 17 has changed in the direction to decrease, this is handled as though it had become less than or equal to the first predetermined value Tα and the stoichiometric combustion mode is selected, accordingly, in a similar manner to the case with the first embodiment, while the fuel consumption of the internal combustion engine 3 increases for a short interval, over the long term it is possible to keep down the fuel consumption of the internal combustion engine 3, due to the intervals in which it is possible to implement the lean combustion mode increasing. Accordingly, it is possible to suppress temperature decrease of the NOx catalyst 17, while still keeping down the fuel consumption of the internal combustion engine 3. Moreover, in this second embodiment, even if there has been some change of the temperature Tnc of the NOx catalyst 17 in the direction to decrease, still the EV mode is selected if the temperature Tnc of the NOx catalyst 17 is less than or equal to the predetermined value Tγ which is lower than the lower limit of the temperature range for activation. Due to this, in a similar manner to the case with the first embodiment, in some cases this is more advantageous from the standpoint of system efficiency than maintaining the stoichiometric combustion mode if the temperature Tnc of the NOx catalyst 17 has changed in the direction to decrease (refer to FIG. 6).

The present invention is not limited to the embodiments described above; it can be implemented in various ways within the scope of the gist of the present invention. The exhaust purification catalyst is not limited to being the NOx catalyst that was provided in the embodiments described above; the present invention can be applied to a hybrid vehicle that is equipped with an internal combustion engine that is provided with a catalyst of some other type. Moreover, in the embodiments described above, the condition that, if the requested power belongs to the region R2 of FIG. 2, the system efficiency for the various modes is greater in the lean combustion mode as compared to the EV mode, and moreover is lower in the stoichiometric combustion mode as compared to the EV mode, was used as an example of the specific condition. However, provided that the magnitude relationship of the system efficiency between three operational modes is the same as in the case of the specific condition described above, the present invention may be applied even if the requested power does not belong to the region R2 of FIG. 2. Moreover while in the embodiments described above the start catalyst 16, which served as a three-way catalyst, was disposed at the upstream side of the NOx catalyst 17, the number and the arrangement of the exhaust purification catalysts is not to be considered as being limited. Provided that, with respect to a first one of the catalysts, the capacity of the other three-way catalyst is small, it would also be acceptable to arrange to provide the three-way catalyst at the downstream side of the first catalyst.

The invention claimed is:

1. A control apparatus of a hybrid vehicle that is applied to a hybrid vehicle that comprises, as power sources for propulsion, an internal combustion engine that has an exhaust purification catalyst that purifies its exhaust and that can be changed over between lean combustion and stoichiometric combustion and an electric motor, and that is capable of operating in a plurality of modes including an EV mode in which the internal combustion engine is stopped and the electric motor is driven, a lean combustion mode in which the internal combustion engine is operated with the lean combustion, and a stoichiometric combustion mode in which the internal combustion engine is operated with the stoichiometric combustion; and comprising a mode selection device configured to select preferentially, from the plurality of modes, that mode for which the system efficiency in relation to the requested power is the highest;

wherein, under a condition that the system efficiency is higher for the lean combustion mode as compared to the EV mode and moreover is lower for the stoichiometric combustion mode as compared to the EV mode, the mode selection device selects the stoichiometric combustion mode when the temperature of the exhaust purification catalyst is less than or equal to a first predetermined value.

2. A control apparatus according to claim 1, wherein the mode selection device selects the EV mode if, under the condition, the temperature of the exhaust purification catalyst becomes less than or equal to a second predetermined value that is lower than the first predetermined value.

3. A control apparatus according to claim 2, wherein the internal combustion engine further comprises a three-way catalyst whose capacity is less than that of the exhaust purification catalyst; and further comprising a catalyst temperature rise control device configured to implement catalyst temperature rise control in which the temperature of the exhaust purification catalyst and the temperature of the three-way catalyst are forcibly elevated if the temperature of the three-way catalyst is less than or equal to the lower limit value of the temperature range in which the three-way catalyst activates.

4. A control apparatus according to claim 1, wherein an NOx catalyst is provided as the exhaust purification catalyst, and the lower limit value of the temperature range in which the NOx catalyst activates is set as the first predetermined value.

5. A control apparatus according to claim 2, wherein an NOx catalyst is provided as the exhaust purification catalyst, and the lower limit value of the temperature range in which the NOx catalyst activates is set as the first predetermined value.

6. A control apparatus according to claim 3, wherein an NOx catalyst is provided as the exhaust purification catalyst, and the lower limit value of the temperature range in which the NOx catalyst activates is set as the first predetermined value.

\* \* \* \* \*